(12) United States Patent
Fujio et al.

(10) Patent No.: US 11,569,776 B2
(45) Date of Patent: Jan. 31, 2023

(54) ROTARY CONNECTOR

(71) Applicant: OMRON Corporation, Kyoto (JP)

(72) Inventors: Kohei Fujio, Gifu (JP); Mitsunori Sugiura, Nagoya (JP)

(73) Assignee: OMRON CORPORATION, Kyoto (JP)

( * ) Notice: Subject to any disclaimer, the term of this patent is extended or adjusted under 35 U.S.C. 154(b) by 247 days.

(21) Appl. No.: 17/173,220

(22) Filed: Feb. 11, 2021

(65) Prior Publication Data
US 2021/0305930 A1    Sep. 30, 2021

(30) Foreign Application Priority Data

Mar. 31, 2020 (JP) .............................. JP2020-063790

(51) Int. Cl.
| | |
|---|---|
| H02P 25/18 | (2006.01) |
| H02P 6/16 | (2016.01) |
| H02P 29/60 | (2016.01) |
| H02J 50/12 | (2016.01) |
| H02J 50/80 | (2016.01) |
| F21V 23/00 | (2015.01) |
| H05B 45/18 | (2020.01) |
| F21V 21/15 | (2006.01) |
| F21Y 115/10 | (2016.01) |

(52) U.S. Cl.
CPC .............. *H02P 29/60* (2016.02); *F21V 21/15* (2013.01); *F21V 23/005* (2013.01); *H02J 50/12* (2016.02); *H02J 50/80* (2016.02); *H05B 45/18* (2020.01); *F21Y 2115/10* (2016.08)

(58) Field of Classification Search
CPC ............... H02P 3/14; H02P 23/14; H02P 6/24
See application file for complete search history.

(56) References Cited

U.S. PATENT DOCUMENTS

2019/0089200 A1* 3/2019 Hosotani ................. H02J 50/12

FOREIGN PATENT DOCUMENTS

| EP | 3185392 A1 * | 6/2017 | .............. B60L 53/12 |
| JP | 2015-216795 A | 12/2015 | |

* cited by examiner

*Primary Examiner* — Kawing Chan
*Assistant Examiner* — Charles S Laughlin
(74) *Attorney, Agent, or Firm* — Metrolex IP Law Group, PLLC

(57) ABSTRACT

In response to a measured value of temperature of a stator by a thermometer exceeding a first temperature threshold, an overheat signal may be output to a rotor of a rotary connector via a communication device. In response to the measured value of the temperature exceeding a second temperature threshold higher than the first temperature threshold, power supply to a transmission coil that transmits power to a receiving coil of the rotor in a non-contact manner is stopped. In response to the overheat signal being received or a measured value of temperature of the rotor by a thermometer exceeding a third temperature threshold, a limit signal for limiting current flowing through a load circuit is output. In response to the measured value of the temperature by the thermometer exceeding a fourth temperature threshold higher than the third temperature threshold, output of power received from the stator is stopped.

1 Claim, 6 Drawing Sheets

ROTARY CONNECTOR

CROSS-REFERENCE TO RELATED APPLICATION

This application claims priority to prior Japanese Patent Application No. 2020-063790 filed with the Japan Patent Office on Mar. 31, 2020, the entire contents of which are incorporated herein by reference.

FIELD

The disclosure relates to a rotary connector capable of transmitting power from one member to another member that rotates relative to the one member in a non-contact manner.

BACKGROUND

A connector capable of transmitting power from one member to another member that rotates relative to the one member in a non-contact manner (hereinafter referred to as a rotary connector) has been proposed (for example, see Japanese Patent Application Laid-Open No. 2015-216795).

A non-contact power transmission device disclosed in Japanese Patent Application Laid-Open No. 2015-216795 includes a light-transmitting first holder in which a first through hole is formed and a light-transmitting second holder in which a second through hole is formed. A first coil and a second coil circulate around the first through hole and the second through hole. A first optical element held in the first holder and a second optical element held in the second holder perform optical communication using the first holder and the second holder as light guide paths.

In a technique disclosed in Japanese Patent Application Laid-Open No. 2015-216795, it is possible to transmit power in a non-contact manner between the coil provided in the one member (first holder) and the coil provided in the other member (second holder). In a case where the power is transmitted in the non-contact manner, for example, in response to a foreign substance having conductivity being mixed between the two coils, or in response to some trouble occurring in a device on a power receiving side, a dangerous state such as abnormal heat generation, smoke or ignition in some cases, or deformation may occur to the rotary connector.

SUMMARY

A rotary connector according to one or more embodiments is provided, which may be capable of preventing failure due to an excessive temperature rise.

A rotary connector according to one or more embodiments may include: a stator; and a rotor rotatably arranged around a rotation axis passing through the stator, the rotary connector being configured to transmit power from the stator to the rotor. In the rotary connector, the stator may include a transmission coil provided around the rotation axis and configured to supply power to the rotor, a power supply circuit configured to supply AC power to the transmission coil, a first thermometer configured to measure temperature of the stator, a first communication device configured to communicate with the rotor, and a first control circuit configured to control the power supply circuit. In addition, the rotor may include a receiving coil provided around the rotation axis and configured to receive power from the transmission coil, a power receiving circuit configured to rectify the power received through the receiving coil to output it to a load circuit, a second thermometer configured to measure temperature of the rotor, a second communication device configured to communicate with the first communication device of the stator, and a second control circuit configured to control the power receiving circuit. The first control circuit of the stator controls the power supply circuit so that, in response to a measured value of the temperature of the stator by the first thermometer exceeding a first temperature threshold, an overheat signal is output to the rotor via the first communication device, in response to the measured value of the temperature of the stator by the first thermometer exceeding a second temperature threshold higher than the first temperature threshold, power supply from the power supply circuit to the transmission coil is stopped. The second control circuit of the rotor controls the power receiving circuit so that, in response to the overheat signal being received via the second communication device or a measured value of the temperature of the rotor by the second thermometer exceeding a third temperature threshold, a limit signal for limiting current flowing through the load circuit is output to the load circuit, in response to the measured value of the temperature of the rotor by the second thermometer exceeding a fourth temperature threshold higher than the third temperature threshold, power output from the power receiving circuit to the load circuit is stopped. By having such a configuration, the rotary connector according to one or more embodiments may prevent failure due to an excessive temperature rise.

DETAILED DESCRIPTION

Hereinafter, a rotary connector according to one or more embodiments is described with reference to the drawings. A rotary connector has a stator and a rotor provided so as to be rotatable relative to the stator with a rotation axis common to the stator and the rotor as the center of rotation. A coil is provided in each of the stator and the rotor, and power can be transmitted from the stator side to the rotor side in a non-contact manner via these coils. Further, in the rotary connector, an optical communication element capable of communicating between the stator and the rotor is provided near the rotation axis. Furthermore, in the rotary connector, a thermometer is provided for each of the stator and the rotor. In response to a measured value of temperature by the thermometer provided in either the stator or the rotor exceeding a safe temperature threshold, which is an upper limit of temperature at which safe use is possible, current flowing through a load circuit attached to the rotor is limited. Furthermore, in response to the measured value of the temperature by the thermometer provided in either the stator or the rotor exceeding an upper limit temperature threshold, which is a maximum temperature at which the rotary connector can be used, power transmission or power output is stopped. In the above described way, the rotary connector monitors the temperature of both the stator and the rotor to limit an amount of current or to stop power transmission or power output according to the monitored temperature. Therefore, it is possible to prevent failure due to an excessive temperature rise.

Figure 1:
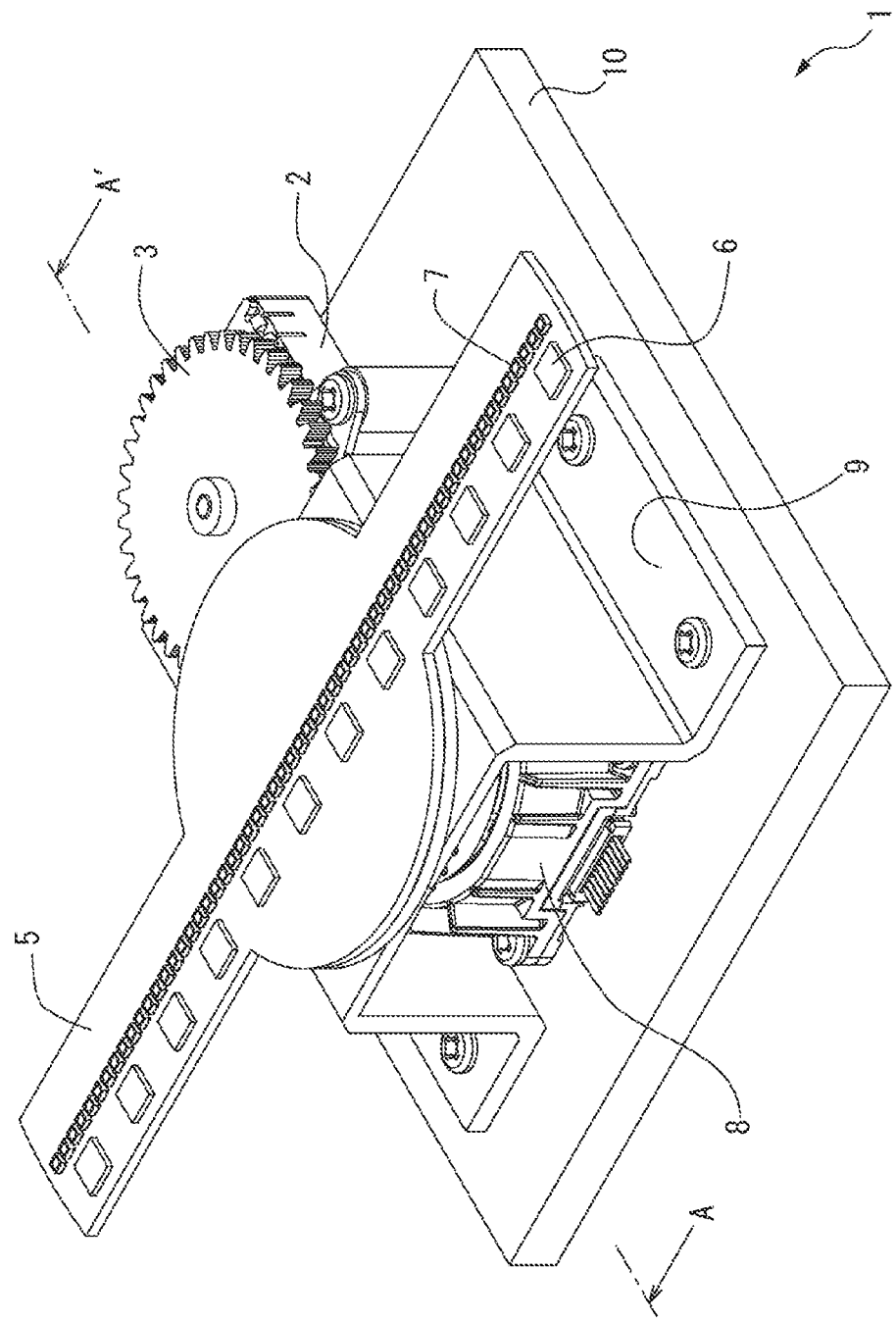
FIG. 1 is a diagram illustrating schematic perspective view of a light emitting device including a rotary connector according to one or more embodiments.
Figure 2:
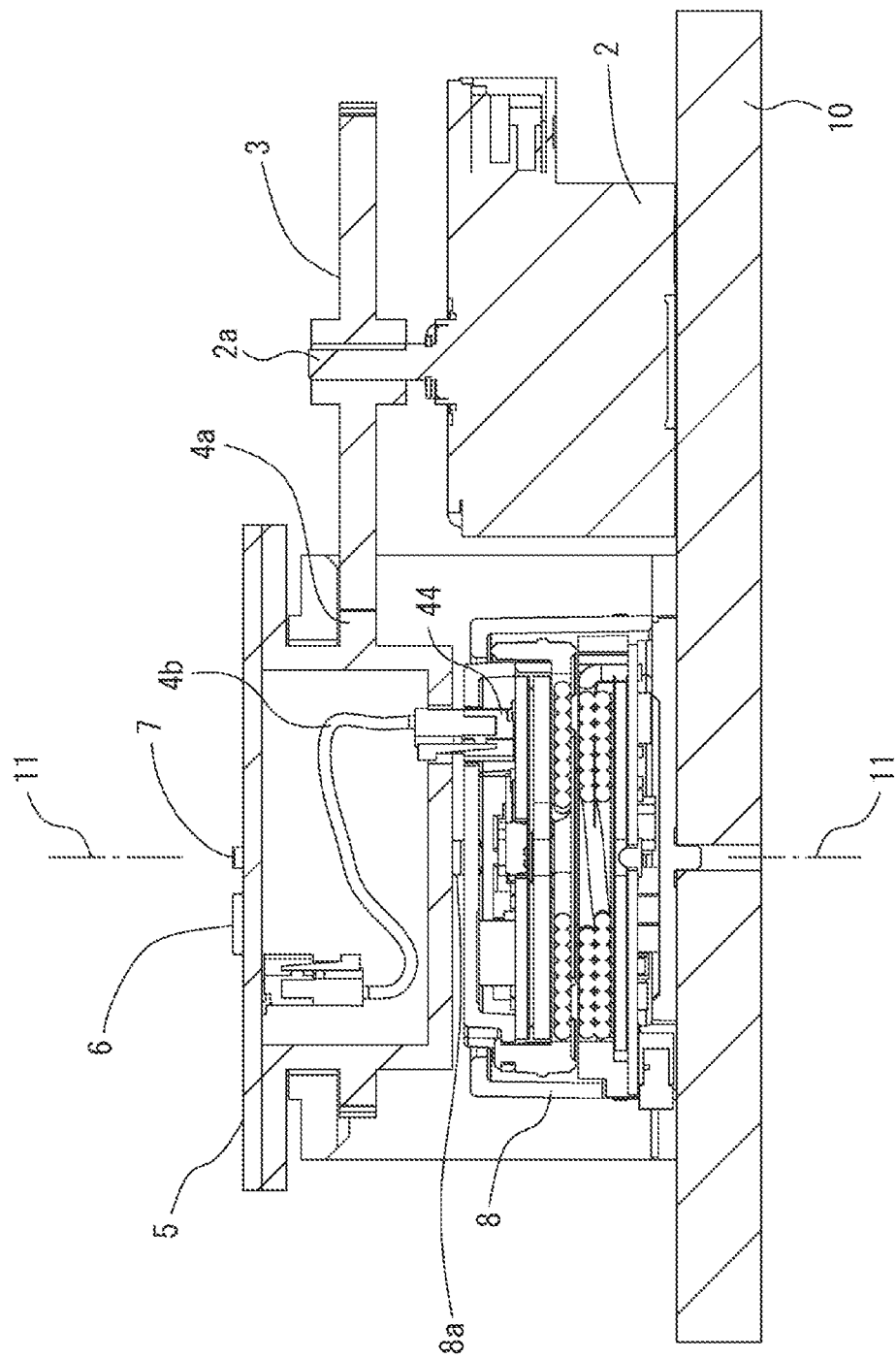
FIG. 2 is a diagram illustrating a schematic sectional view of a light emitting device along section line AA' in FIG. 1.

FIG. 1 is a schematic perspective view of a light emitting device including a rotary connector according to one or more embodiments. FIG. 2 is a schematic sectional view of the light emitting device along line AA' in FIG. 1.

As shown in FIGS. 1 and 2, a light emitting device 1 includes a motor 2, a gear 3, a rotating body 4, a circuit board 5, a plurality of LED drive circuits 6, a plurality of LEDs 7, a rotary connector 8, and a support member 9. The light emitting device 1 is installed on a substrate 10, and rotation of the motor 2 causes the rotating body 4 to rotate via the gear 3, so that the plurality of LEDs 7 provided on the circuit board 5 attached to the rotating body 4 rotates on a surface substantially parallel to the substrate 10. Furthermore, power supplied to the plurality of LED drive circuits 6 via the rotary connector 8 causes the plurality of LEDs 7 to light up. Therefore, the rotating body 4 rotates while each LED 7 is lit, so that an observer located on a front side of the substrate 10 can see multiple emitting circles concentrically centering on a rotation axis 11 of the rotating body 4 which is substantially parallel to a normal direction of the substrate 10. Note that, in the following, for convenience of explanation, a surface of the substrate 10 on which the light emitting device 1 is attached is referred to as a surface, an upper surface, or a front surface, and an opposite surface thereof is referred to as a reverse surface, a lower surface, or a back surface.

The motor 2 is, for example, a DC motor or an AC motor, and is installed on the surface of the substrate 10 outside the support member 9 so that the normal direction of the substrate 10 and a rotation shaft 2a of the motor 2 are parallel to each other. The disk-shaped gear 3 is attached to the rotation shaft 2a. Further, the rotary connector 8 and the rotating body 4 stacked and installed in order from the substrate 10 side upward are housed in the U-shaped support member 9 installed on the surface of the substrate 10. The rotating body 4 has a hollow substantially cylindrical shape with the rotation axis 11 as a central axis, and teeth 4a for engaging with the gear 3 are formed along a side surface thereof. It should be noted that in one or more embodiments, the rotation axis 11 is defined in design, and there is no need for a member constituting the rotation axis 11. As a result, in response to the motor 2 rotating, the rotating body 4 also rotates via the gear 3. A substantially circular hole is formed on an upper surface of the support member 9, and an upper portion of the rotating body 4 projects from the support member 9 to an upper side of the support member 9 through the hole. The plate-shaped circuit board 5 is attached to an upper surface of the rotating body 4 so as to be substantially parallel to the surface of the substrate 10. The plurality of LEDs 7 is installed on the surface of the circuit board 5 so as to be lined up in a row. Furthermore, the plurality of LED drive circuits 6 for controlling lighting and extinguishing of each LED 7 is also installed on the surface of the circuit board 5. Note that each LED drive circuit 6 and each LED 7 is an example of a load circuit. Furthermore, a lower surface of the rotating body 4 is provided with a hole for engaging with a projection 8a provided on an upper surface of a rotor of the rotary connector 8. In response to the projection of the rotor being inserted into the hole, the rotor and the rotating body 4 are fixed so as to rotate integrally. Power is supplied from the rotary connector 8 to each LED drive circuit 6 and each LED 7 via a power cable 4b provided inside the rotating body 4 and connected to an output connector 44 of the rotary connector 8.

The rotary connector 8 according to one or more embodiments is installed in the support member 9 below the rotating body 4 and on the surface of the substrate 10. The rotary connector 8 supplies power supplied from a power source (not shown) to each LED drive circuit 6 and each LED 7 via the rotating body 4.

Figure 3:
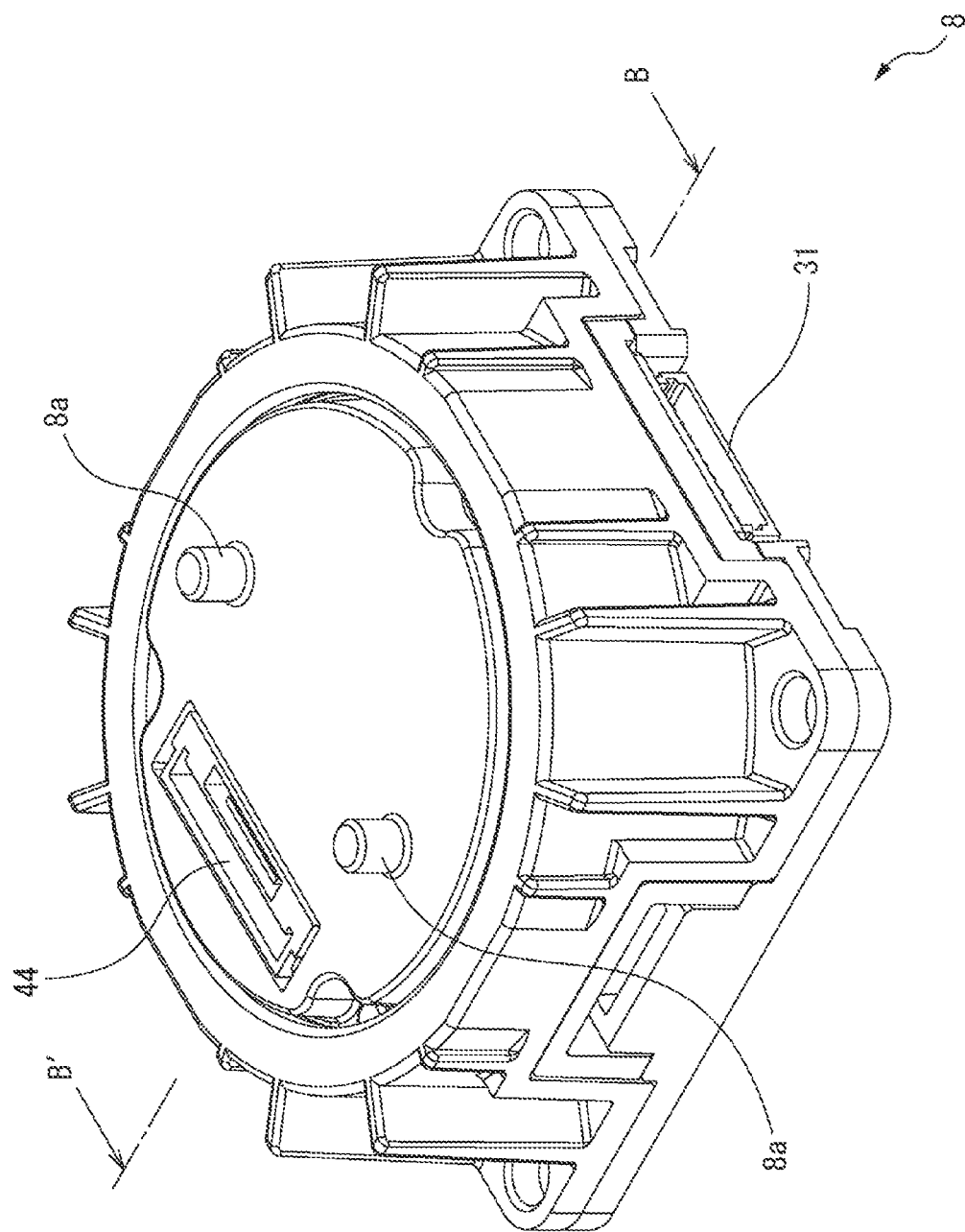
FIG. 3 is a diagram illustrating a schematic perspective view of a rotary connector according to one or more embodiments.
Figure 4:
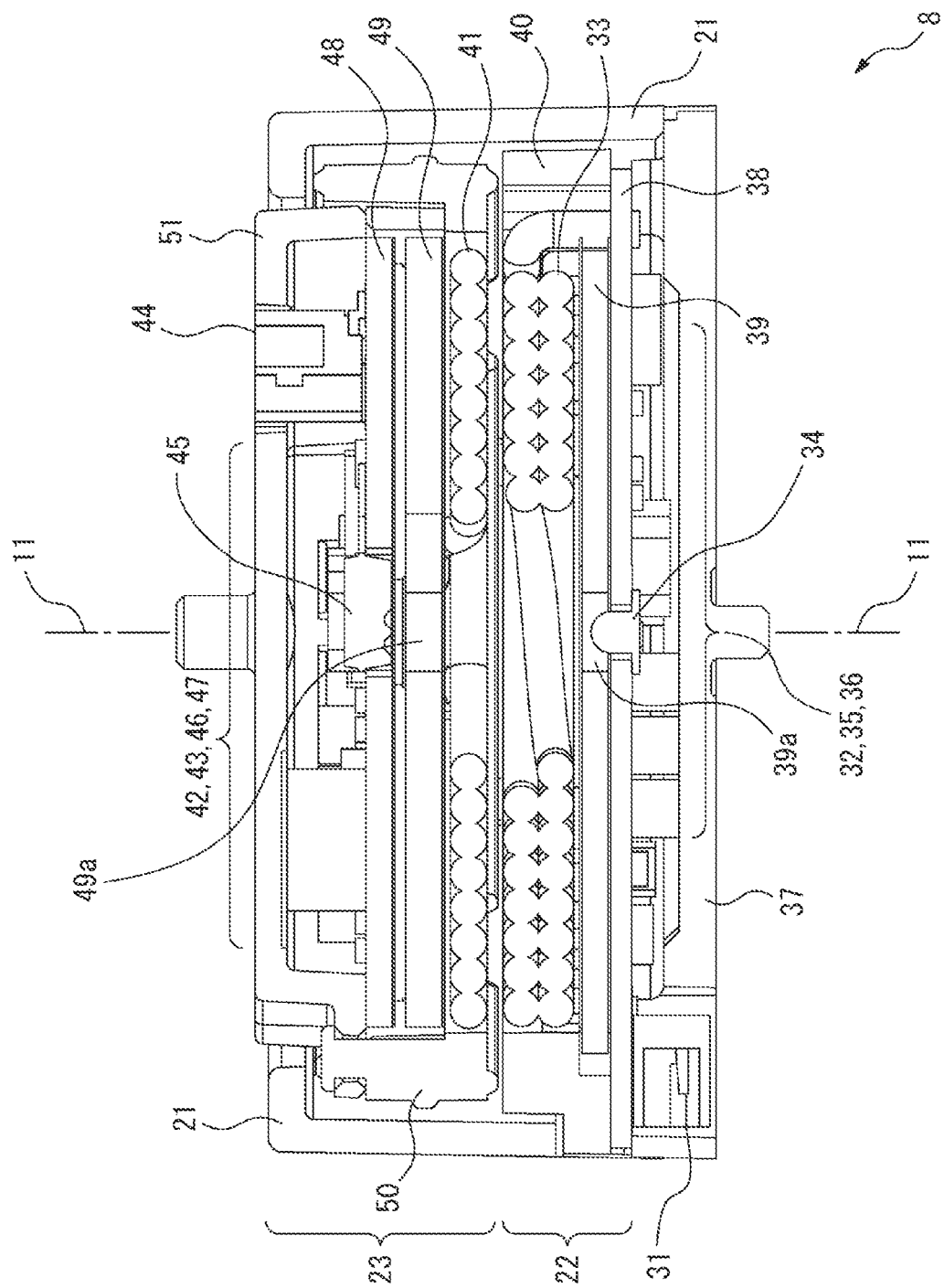
FIG. 4 is a diagram illustrating a schematic sectional view of a rotary connector along section line BB' in FIG. 3.
Figure 5:
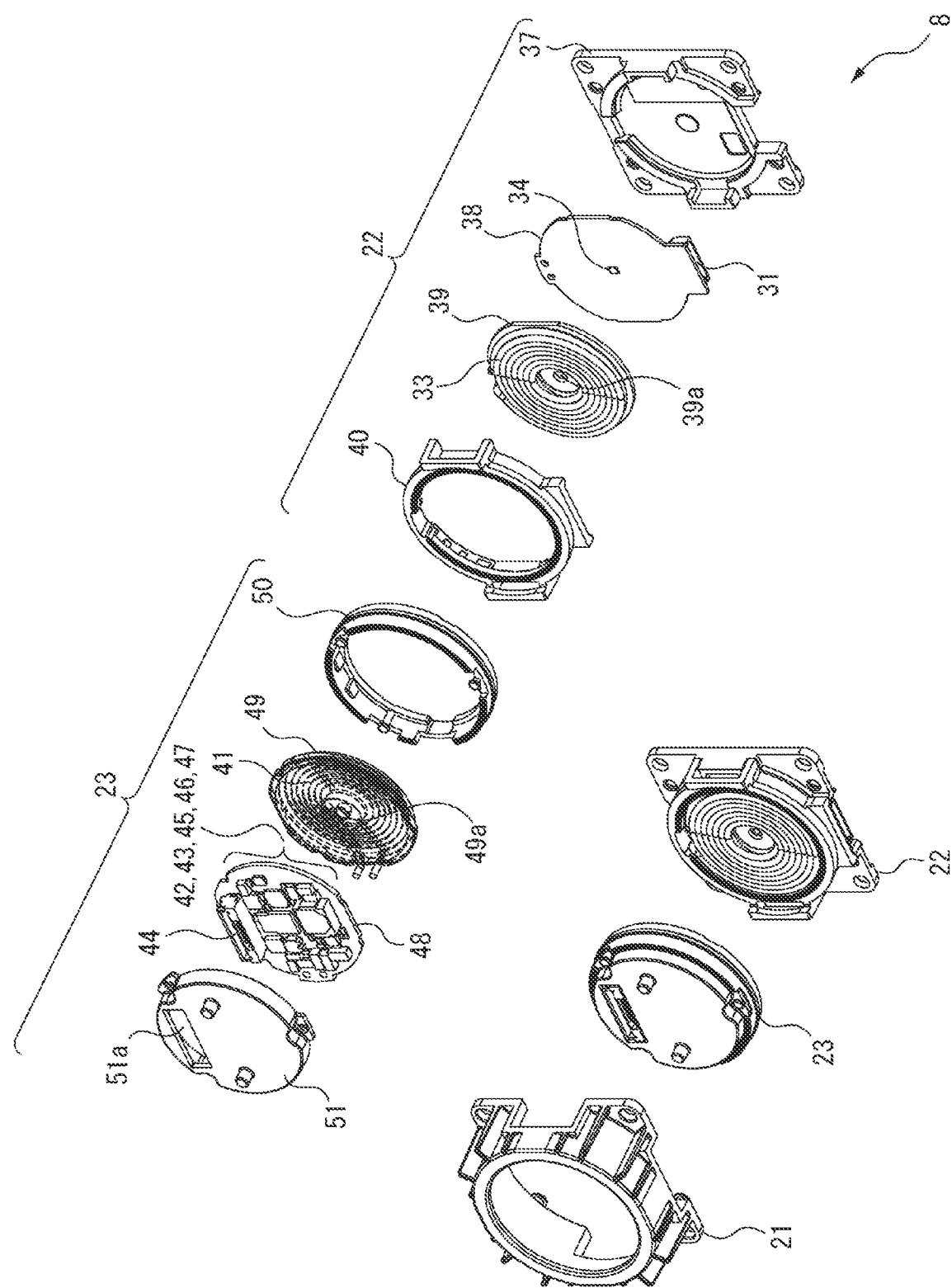
FIG. 5 is a diagram illustrating an exploded perspective view of a rotary connector.
Figure 6:
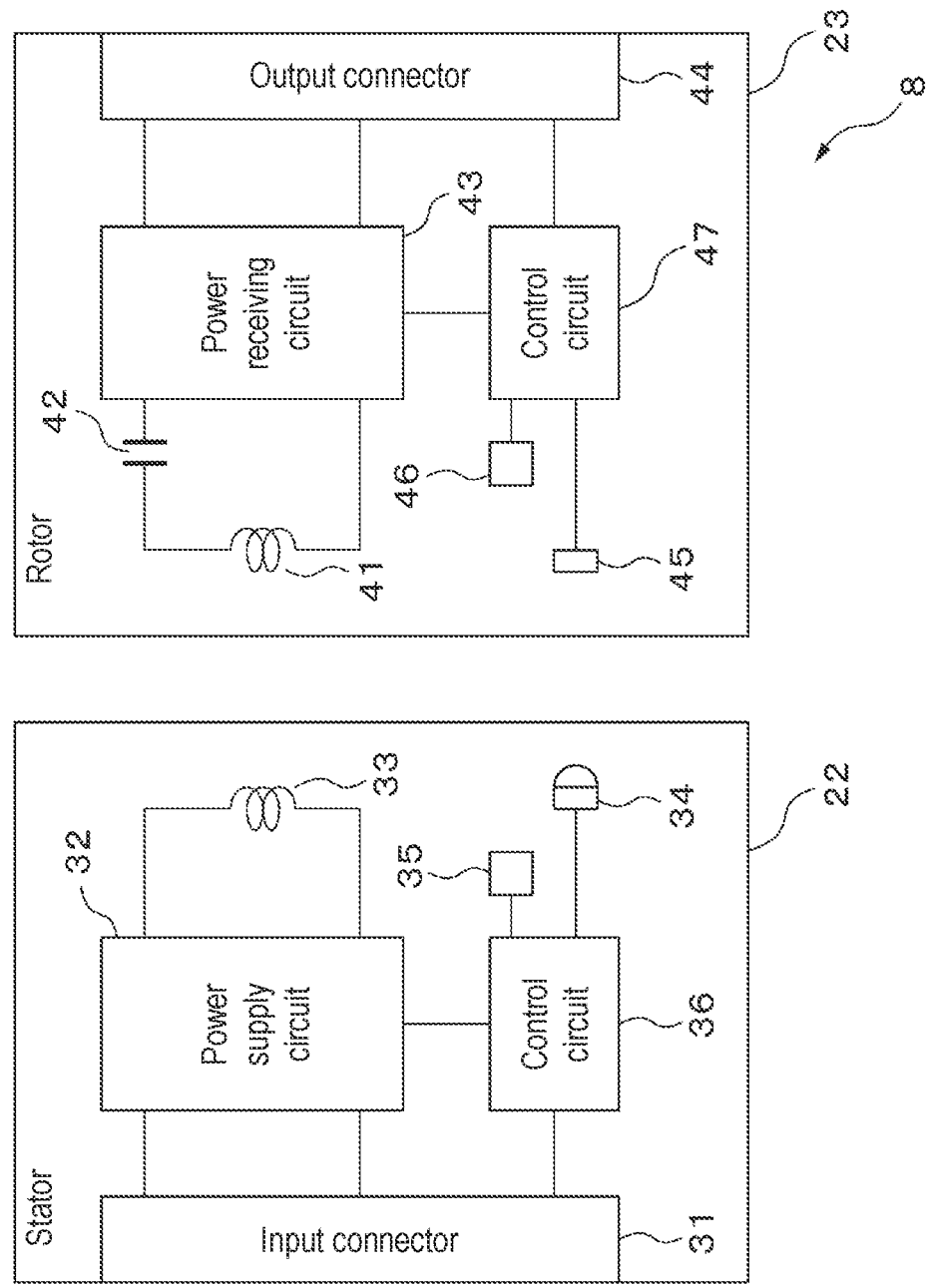
FIG. 6 is a circuit block diagram illustrating a rotary connector.

FIG. 3 is a schematic perspective view of the rotary connector 8. FIG. 4 is a schematic sectional view of the rotary connector 8 in line BB' in FIG. 3. Further, FIG. 5 is an exploded perspective view of the rotary connector 8. Furthermore, FIG. 6 is a circuit block diagram of the rotary connector 8. The rotary connector 8 includes a case 21 formed in a hollow cylindrical shape, and a stator 22 and a rotor 23 housed in the case 21 and stacked and installed in order from the substrate 10 side upward. The stator 22 and the rotor 23 are each formed in a substantially columnar shape with the rotation axis 11 as a central axis. The rotor 23 is rotatable relative to the stator 22 with the rotation axis 11 as the center of rotation. Further, the projection 8a for fixing the rotating body 4 is formed on the upper surface of the rotor 23.

Further, the rotary connector 8 can supply power from the stator 22 to the rotor 23 in a non-contact manner. The rotary connector 8 can be a non-contact power feeding device of a system in which a receiving coil and a resonance capacitor resonate in series on a secondary side (power receiving side, rotor 23 side in one or more embodiments) without utilizing resonance on a primary side (power transmission side, stator 22 side in one or more embodiments) (NS system). Alternatively, the rotary connector 8 may be a non-contact power feeding device of a system in which the receiving coil and the resonance capacitor resonate in parallel on the secondary side without utilizing the resonance on the primary side (NP system). Alternatively, the rotary connector 8 may be, for example, a non-contact power feeding device of a so-called primary series secondary series resonance capacitor system (SS system) or of a primary series secondary parallel resonance capacitor system (SP system).

First, the stator 22 will be described. The stator 22 includes an input connector 31, a power supply circuit 32, a transmission coil 33, an optical communication element 34, a thermometer 35, a control circuit 36, a bottom plate 37, a circuit board 38, a ferrite core 39, and an outer peripheral member 40. The input connector 31, the power supply circuit 32, the optical communication element 34, the thermometer 35, and the control circuit 36 are provided on the circuit board 38. The circuit board 38 is disposed on the bottom plate 37 forming one part of a casing of the stator 22 and fixed to the surface of the substrate 10 by using screws or the like. Further, the transmission coil 33 is wound around the rotation axis 11 so as to be centered on the rotation axis 11 in the substantially disk-shaped ferrite core 39. The ferrite core 39 is provided in the stator 22 above the circuit board 38, that is, closer to the rotor 23. The input connector 31, the power supply circuit 32, the transmission coil 33, the optical communication element 34, the thermometer 35, and the control circuit 36 are placed inside the outer peripheral member 40 forming another part of the casing of the stator 22 together with the bottom plate 37.

The input connector 31 is a connector for connecting with an external DC power supply, and DC power is supplied from the external DC power supply via the input connector 31. The DC power supplied through the input connector 31 is output to the power supply circuit 32. Further, the input connector 31 has a terminal connected with a signal line to the control circuit 36. The input connector outputs a signal from another device (for example, a control circuit of a device in which the rotary connector 8 is used) to the control circuit 36, or outputs a signal from the control circuit 36 to the other device.

The power supply circuit 32 converts the DC power supplied via the input connector 31 into AC power and supplies the AC power to the transmission coil 33. Therefore, the power supply circuit 32 has, for example, an inverter circuit (not shown) that converts DC power supplied via the input connector 31 into AC power and supplies it to the transmission coil 33. The inverter circuit may be a full-bridge inverter in which four switching elements (for example, MOSFETs) are connected in a full-bridge shape, or a half-bridge inverter in which two switching elements are connected in a half-bridge shape. The control circuit 36 controls on/off switching of each switching element of the inverter circuit so that frequency of the AC power supplied to the transmission coil 33 becomes a predetermined frequency (for example, a frequency at which a resonance circuit of the rotor 23 resonates), so that the power supply circuit 32 supplies the AC power having the predetermined frequency to the transmission coil 33.

Furthermore, the power supply circuit 32 has a DC-DC converter (not shown), and converts voltage of the DC power supplied via the input connector 31 into voltage suitable for driving the optical communication element 34, the thermometer 35, and the control circuit 36. The power supply circuit supplies DC power having the converted voltage to the optical communication element 34, the thermometer 35, and the control circuit 36.

The transmission coil 33 is wound along the ferrite core 39 so that the rotation axis 11 is a winding axis. The transmission coil 33 transmits the AC power supplied from the power supply circuit 32 to a receiving coil 41 of the rotor 23 via a space. Note that the stator 22 may have a capacitor connected in series with the transmission coil 33 between the transmission coil 33 and the inverter circuit of the power supply circuit 32. The capacitor may be used to cut off DC power, or may be used to form a resonance circuit that resonates with the transmission coil 33 at the frequency of the AC power supplied to the transmission coil 33.

The optical communication element 34 is an example of a first communication device, and transmits a signal from the control circuit 36 of the stator 22 to the rotor 23. Therefore, the optical communication element 34 has a light emitting element such as an LED. The optical communication element 34 is attached so that its light emitting surface faces upward at or near a position overlapping the rotation axis 11 on the circuit board 38. Further, a hole 39a is formed in the ferrite core 39 at the position overlapping the rotation axis 11. Therefore, light emitted by the optical communication element 34 reaches an optical communication element of the rotor 23 through the hole 39a of the ferrite core 39. Further, lighting and extinguishing of the optical communication element 34 is controlled by the control circuit 36.

The thermometer 35 is an example of a first thermometer, and is attached to the circuit board 38 as described above. While power is supplied to the rotary connector 8, the thermometer measures temperature of the stator 22 (in one or more embodiments, internal temperature of the stator 22).

The thermometer 35 outputs a signal value representing a measured value of the temperature of the stator 22 to the control circuit 36.

The control circuit 36 is an example of a first control circuit, and controls each part of the stator 22. The control circuit 36 includes, for example, an arithmetic circuit, a non-volatile semiconductor memory, a drive circuit such as a gate driver for driving the power supply circuit 32, and a circuit for controlling lighting or extinguishing of the light emitting element of the optical communication element 34. Note that the thermometer 35 may be built in the control circuit 36.

In one or more embodiments, the control circuit 36 controls the power supply circuit 32 according to the measured value of the temperature by the thermometer 35. Further, the control circuit 36 controls the optical communication element 34 according to the measured value of the temperature by the thermometer 35. Note that details of the control by the control circuit 36 will be described later.

Next, the rotor 23 will be described. The rotor 23 includes the receiving coil 41, a resonance capacitor 42, a power receiving circuit 43, the output connector 44, an optical communication element 45, a thermometer 46, a control circuit 47, a circuit board 48, a ferrite core 49, an outer peripheral member 50, and a lid member 51.

The resonance capacitor 42, the power receiving circuit 43, the output connector 44, the optical communication element 45, the thermometer 46, and the control circuit 47 are provided on the circuit board 48. The circuit board 48 is formed in a substantially cylindrical shape, and is mounted to inside of the outer peripheral member 50 that forms a part of a casing of the rotor 23. Further, the receiving coil 41 is wound around the rotation axis 11 so as to be centered on the rotation axis 11 in the substantially disk-shaped ferrite core 49. The ferrite core 49 is provided in the rotor 23 below the circuit board 48, that is, closer to the stator 22. Furthermore, the lid member 51 having a substantially disk-shaped top plate and a cylindrical outer wall along an outer circumference of the top plate is attached to the outer peripheral member 50 above the circuit board 48 with screws or the like, and forms the casing of the rotor 23 together with the outer peripheral member 50.

The receiving coil 41 is wound along the ferrite core 49 so that the rotation axis 11 is a winding axis, that is, the winding axis of the transmission coil 33 of the stator 22 and the winding axis of the receiving coil 41 are substantially aligned with each other. The receiving coil 41 is disposed so that the receiving coil 41 and the transmission coil 33 face each other. As a result, even if the rotor 23 rotates, a relative positional relationship between the transmission coil 33 and the receiving coil 41 does not change so much. Therefore, even if the rotor 23 is rotating, power can be transmitted to the receiving coil 41 from the transmission coil 33 in a non-contact manner.

Further, the receiving coil 41 forms a resonance circuit together with the resonance capacitor 42, and receives power from the transmission coil 33 by resonating with alternating current flowing through the transmission coil 33. Therefore, the resonance capacitor 42 may be connected in series with the receiving coil 41, or may be connected in parallel with the receiving coil 41. The AC power output from the resonance circuit formed by the receiving coil 41 and the resonance capacitor 42 is output to the power receiving circuit 43. Note that the number of turns of the receiving coil 41 and the number of turns of the transmission coil 33 may be the same or different from each other.

The power receiving circuit 43 rectifies the power received via the receiving coil 41 and outputs it to the load circuit connected to the output connector 44. In one or more embodiments, the power receiving circuit 43 converts the AC power from the resonance circuit formed by the receiving coil 41 and the resonance capacitor 42 into DC power, and outputs the DC power to each LED drive circuit 6 and each LED 7 provided on the rotating body 4 fixedly attached to the rotor 23 via the output connector 44 connected to the power receiving circuit 43. Therefore, the power receiving circuit 43 includes, for example, a full-wave rectifier circuit that converts the AC power from the resonance circuit into pulsating power and a smoothing capacitor for smoothing the pulsating power output from the full-wave rectifier circuit and outputting it to the load circuit. Furthermore, the power receiving circuit 43 includes a load switch for switching connection or disconnection between the output connector 44 and the power receiving circuit 43.

The output connector 44 is attached to the circuit board 48 so that its opening faces upward. The opening of the output connector 44 is exposed through a hole 51a formed in the top plate of the lid member 51. In one or more embodiments, the power cable 4b provided inside the rotating body 4 is connected to the output connector 44, and power is supplied from the power receiving circuit 43 to each LED drive circuit 6 and each LED 7 via the output connector 44. Furthermore, the output connector 44 is provided with a terminal for outputting a control signal to each LED drive circuit 6, and a signal line provided inside the rotating body 4 is connected to the terminal. A signal from the control circuit 47 of the rotor 23 (for example, a limit signal described later) is output to each LED drive circuit 6.

The optical communication element 45 is an example of a second communication device, and receives a signal from the control circuit 36 of the stator 22. Therefore, the optical communication element 45 has a light receiving element such as a photodiode. The optical communication element 45 is attached so that its light receiving surface faces downward, that is, it faces the light emitting surface of the optical communication element 34 of the stator 22 at or near a position overlapping the rotation axis 11 on the circuit board 48. Further, in the ferrite core 49, a hole 49a is formed at a position overlapping the rotation axis 11. Therefore, the optical communication element 45 can receive light emitted by the optical communication element 34 of the stator 22 through the hole 49a of the ferrite core 49. By attaching the optical communication element 45 in the above described way, even if the rotor 23 rotates, a relative positional relationship between the optical communication element 34 of the stator 22 and the optical communication element 45 of the rotor 23 does not substantially change. Instead, it is possible to transmit a signal between the optical communication elements 34 and 45. The optical communication element 45 outputs voltage corresponding to a received light amount to the control circuit 47.

The thermometer 46 is an example of a second thermometer, and is attached to the circuit board 48 as described above. While the stator 22 supplies power to the rotor 23, the thermometer measures temperature of the rotor 23 (in one or more embodiments, internal temperature of the rotor 23). The thermometer 46 outputs a signal value representing a measured value of the temperature of the rotor 23 to the control circuit 47.

The control circuit 47 is an example of a second control circuit, and controls each part of the rotor 23. Therefore, the control circuit 47 includes, for example, an arithmetic circuit, a non-volatile semiconductor memory, a drive circuit for driving the load switch included in the power receiving circuit 43, a receiving circuit for receiving a signal from the optical communication element 45, and an interface for outputting a control signal. Note that the thermometer 46 may be built in the control circuit 47.

Details of operation of the control circuit 36 in the stator 22 and the control circuit 47 in the rotor 23 will be described below.

In response to a measured value of temperature of the stator 22 by the thermometer 35 being equal to or less than an upper limit temperature threshold (that is, a second temperature threshold), the control circuit 36 of the stator 22 controls on/off switching of each switching element of the inverter circuit of the power supply circuit 32 so that frequency of AC power supplied to the transmission coil 33 becomes a predetermined frequency (for example, a frequency at which the resonance circuit of the rotor 23 resonates). As a result, the AC power having the predetermined frequency is supplied from the power supply circuit 32 to the transmission coil 33, so that power is transmitted from the stator 22 to the rotor 23 via the transmission coil 33 and the receiving coil 41.

On the other hand, in response to the measured value of the temperature of the stator 22 by the thermometer 35 exceeding the upper limit temperature threshold, the control circuit 36 keeps each switching element of the inverter circuit of the power supply circuit 32 off. As a result, power is not supplied from the power supply circuit 32 to the transmission coil 33, so that power supply from the stator 22 to the rotor 23 is stopped. In the above described case, the control circuit 36 may output a warning signal indicating that the temperature of the stator 22 has exceeded the upper limit temperature threshold to another device via the input connector 31.

Further, even if the measured value of the temperature of the stator 22 by the thermometer 35 is equal to or less than the upper limit temperature threshold, in response to the measured value exceeding a safe temperature threshold (that is, a first temperature threshold), the control circuit 36 transmits an overheat signal indicating that the temperature of the stator 22 has exceeded the safe temperature threshold to the control circuit 47 of the rotor 23 via the optical communication element 34.

On the other hand, in response to a measured value of temperature of the rotor 23 by the thermometer 46 exceeding an upper limit temperature threshold (that is, a fourth temperature threshold), the control circuit 47 of the rotor 23 turns off the load switch of the power receiving circuit 43 and controls the power receiving circuit 43 so that power is not supplied to each LED drive circuit 6 and each LED 7.

Further, in response to the measured value of the temperature of the rotor 23 by the thermometer 46 exceeding a safe temperature threshold (that is, a third temperature threshold), the control circuit 47 outputs a limit signal that limits current flowing through each LED 7 to each LED drive circuit 6 via the output connector 44. Similarly, in response to receiving the overheat signal from the control circuit 36 of the stator 22 via the optical communication element 45, the control circuit 47 outputs the limit signal to each LED drive circuit 6 via the output connector 44. Note that in response to receiving the limit signal, each LED drive circuit 6 limits current flowing through one or more LEDs driven by its own circuit among the LEDs 7. Therefore, for example, each LED drive circuit 6 has a current limiting circuit connected in series with the LED driven by the own circuit. The current limiting circuit includes, for example, two resistors R1 and R2 connected in parallel with each other and a switching element such as a MOSFET connected in series with one of the two resistors R1 and R2 (for example, the resistor R1). The limit signal output from the control circuit 47 is represented by, for example, voltage used to control on/off of the switching element in the current limiting circuit. For example, in response to the current flowing through each LED 7 not being limited, voltage for turning on the switching element in the current limiting circuit is output from the control circuit 47 via the output connector 44. For example, in response to the switching element being a MOSFET, relatively high voltage that turns on the MOSFET is output to a gate terminal of the MOSFET. In the above described case, since the current flows through both the two resistors R1 and R2 connected in parallel with each other in the current limiting circuit, an amount of current flowing through the LED connected in series with the current limiting circuit is also relatively large. On the other hand, in response to the current flowing through each LED 7 being limited, voltage for turning off the switching element in the current limiting circuit is output from the control circuit 47 via the output connector 44. For example, in response to the switching element is a MOSFET, relatively low voltage that turns off the MOSFET is output to the gate terminal of the MOSFET. In the above described case, since the current flows through only one of the two resistors R1 and R2 connected in parallel with each other in the current limiting circuit, the amount of current flowing through the LED connected in series with the current limiting circuit is also relatively small.

Note that the upper limit temperature threshold is set to, for example, 100° C. and the safe temperature threshold is set to a temperature lower than the upper limit temperature threshold, for example, 80° C. Further, the upper limit temperature threshold of the stator 22 and the upper limit temperature threshold of the rotor 23 may be different. Similarly, the safe temperature threshold of the stator 22 and the safety temperature threshold of the rotor 23 may be different. Even in the above described case, it is preferable that each temperature threshold be set so that the safe temperature threshold of the stator 22 is less than the upper limit temperature threshold of the rotor 23 and the upper limit temperature threshold of the stator 22 is higher than the safe temperature threshold of the rotor 23.

As described above, the rotary connector supplies power from the stator to the rotor in a non-contact manner. In the rotary connector, each of the stator and the rotor has the thermometer, and communication is possible between the control circuit of the stator and the control circuit of the rotor. In response to a measured value of temperature exceeding a safe temperature threshold in either the stator or the rotor, the rotary connector limits current flowing through the load circuit connected to the rotor and driven by power output from the rotor. Further, in the rotary connector, in response to the measured value of the temperature exceeding an upper limit temperature threshold in the stator, power transmission from the stator to the rotor is stopped. On the other hand, in response to the measured value of the temperature exceeding the upper limit temperature threshold in the rotor, power output from the rotor to the load circuit is stopped. In the above described way, the rotary connector sets a two-step threshold for the measured value of the temperature for each of the stator and the rotor. In response to the measured value of the temperature exceeds one of the thresholds, by executing the control that suppresses heat generation according to the threshold, it is possible to prevent failure due to an excessive temperature rise.

Note that, according to a modification, the optical communication element 34 of the stator 22 and the optical communication element 45 of the rotor 23 may be configured to be able to transmit signals in both directions. In the above described case, for example, the optical communication element 34 and the optical communication element 45 each have a light emitting element and a light receiving element. In response to relative positions of the rotor 23 to the stator 22 with respect to a rotation direction around the rotation axis 11 having a predetermined positional relationship, the light emitting elements and the light receiving elements may be disposed so that the light emitting element of the optical communication element 34 and the light receiving element of the optical communication element 45 face each other and the light emitting element of the optical communication element 45 and the light receiving element of the optical communication element 34 face each other. Even in the above described case, in response to a signal being transmitted from one of the two optical communication elements to the other, the light emitting element of the optical communication element on the transmission side is lit for a predetermined period longer than a rotation period of the rotor 23, so that the signal can be transmitted. Further, in response to any of a plurality of types of signals representing different information being transmitted, for example, a length of a period in which the light emitting element is lit or emission intensity of the light emitting element may be changed for each type of signal.

In the above described case, in response to a measured value of temperature of the rotor 23 by the thermometer 46 of the rotor 23 exceeding the safe temperature threshold, the control circuit 47 of the rotor 23 may transmit a signal indicating that the measured value of the temperature has exceeded the safe temperature threshold to the control circuit 36 of the stator 22 via the optical communication element 45. In response to receiving the signal, the control circuit 36 may reduce voltage of AC power supplied from the power supply circuit 32 to the transmission coil 33. In the above described case, the power supply circuit 32 may have a power factor improving circuit or a variable DC-DC converter between the input connector 31 and the inverter circuit. The control circuit 36 may reduce the voltage of the AC power supplied from the power supply circuit 32 to the transmission coil 33 by controlling the power factor improving circuit or the variable DC-DC converter. Alternatively, the control circuit 36 may control the power supply circuit 32 so that the AC power is intermittently supplied from the power supply circuit 32 to the transmission coil 33.

Further, in response to the measured value of the temperature of the rotor 23 by the thermometer 46 of the rotor 23 exceeding the upper limit temperature threshold, the control circuit 47 of the rotor 23 may transmit a signal indicating that the measured value of the temperature has exceeded the upper limit temperature threshold to the control circuit 36 of the stator 22 via the optical communication element 45. In response to receiving the signal, the control circuit 36 may control the power supply circuit 32 so as to stop supply of the AC power from the power supply circuit 32 to the transmission coil 33.

As described above, those skilled in the art can make various changes according to one or more embodiments within the scope of the invention.

The invention claimed is:
1. A rotary connector comprising:
a stator; and a rotor rotatably arranged around a rotation axis passing through the stator, the rotary connector being configured to transmit power from the stator to the rotor, wherein the stator comprises
- a transmission coil arranged around the rotation axis and configured to supply power to the rotor,
- a power supply circuit configured to supply AC power to the transmission coil,
- a first thermometer configured to measure temperature of the stator,
- a first communication device configured to communicate with the rotor, and
- a first control circuit configured to control the power supply circuit, and the rotor comprises
- a receiving coil arranged around the rotation axis and configured to receive power from the transmission coil,
- a power receiving circuit configured to rectify the power received through the receiving coil to output the power to a load circuit,
- a second thermometer configured to measure temperature of the rotor,
- a second communication device configured to communicate with the first communication device of the stator, and
- a second control circuit configured to control the power receiving circuit, the first control circuit of the stator controls the power supply circuit so that, in response to a measured value of the temperature of the stator by the first thermometer exceeding a first temperature threshold, an overheat signal is output to the rotor via the first communication device, in response to the measured value of the temperature of the stator by the first thermometer exceeding a second temperature threshold higher than the first temperature threshold, power supply from the power supply circuit to the transmission coil is stopped, and the second control circuit of the rotor controls the power receiving circuit so that, in response to the overheat signal being received via the second communication device or a measured value of the temperature of the rotor by the second thermometer exceeding a third temperature threshold, a limit signal for limiting current flowing through the load circuit is output to the load circuit, in response to the measured value of the temperature of the rotor by the second thermometer exceeds a fourth temperature threshold higher than the third temperature threshold, power output from the power receiving circuit to the load circuit is stopped.

* * * * *